(No Model.)

J. B. ANDERSON.
FLUID REGULATOR.

No. 468,737.  Patented Feb. 9, 1892.

Witnesses:
Edward H. Deavitt
William P. Phelps

Inventor:
John B. Anderson
Per E. J. Deavitt Atty

UNITED STATES PATENT OFFICE.

JOHN B. ANDERSON, OF MONTPELIER, VERMONT.

FLUID-REGULATOR.

SPECIFICATION forming part of Letters Patent No. 468,737, dated February 9, 1892.

Application filed December 9, 1886. Serial No. 221,142. (No model.)

*To all whom it may concern:*

Be it known that I, JOHN B. ANDERSON, a citizen of the United States, residing at Montpelier, in the county of Washington and State of Vermont, have invented a new and useful Device for Regulating the Flow of Fluids, of which the following is a full, clear, and exact description of my invention, reference being had to the annexed drawings, making a part of this specification.

Figure 1:
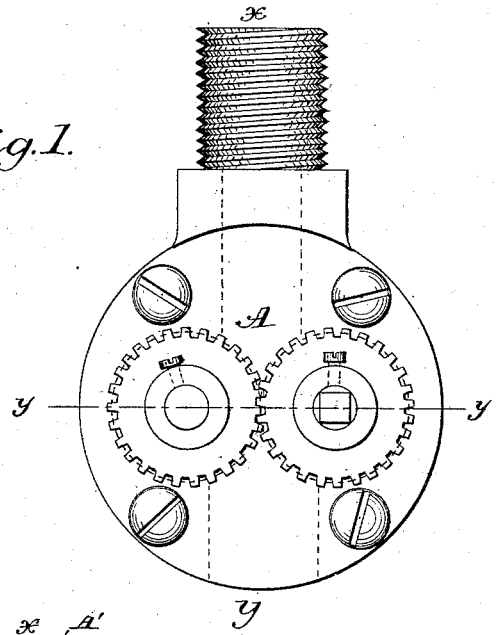
Figure 2:
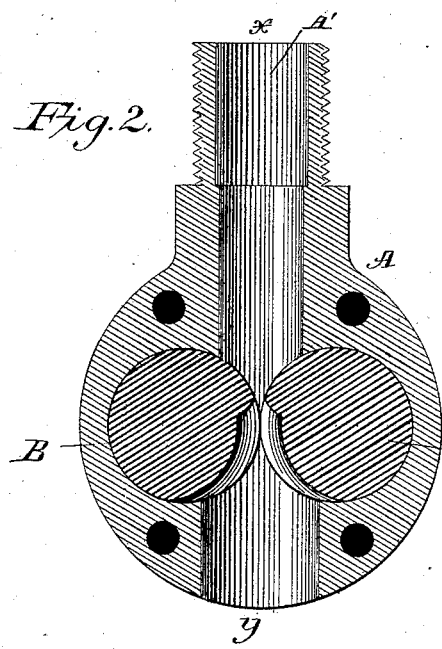
Figure 3:
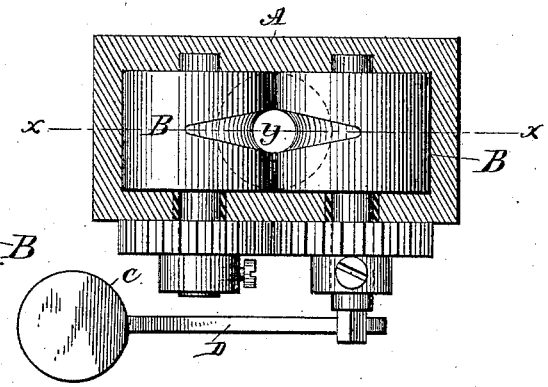

In the drawings, Figure 1 is an elevation of my improved regulator. Fig. 2 is a vertical section on the line $x\ x$ of Fig. 3. Fig. 3 is a horizontal section on the line $y\ y$ of Fig. 1.

My invention consists of a hollow water-tight case A, with inlet $x$ and outlet $y$ at opposite points, containing two cylinders, round or similar shaped, revolving in contact with each other, each having a cam groove or slot partly around its perimeter, the corresponding revolutions of the two cylinders bringing the grooves or slots in opposition, causing an opening or orifice through which the water flows, enlarging or diminishing it, and cutting off the flow, as desired, by revolving the cylinders, as hereinafter described.

The object of my invention is to regulate the passage and pressure of fluids, enlarging or lessening the size of the stream and cutting it off completely by revolving the cam-grooved cylinders. It is easily and automatically operated. The enlarging, lessening, or cutting off the flow by my invention is done gradually without causing any shock or extra strain upon the tubes or pipes connected with it without changing the direction of the stream, breaking the core, or effecting the pressure thereof.

In the drawings, A represents the water-tight case holding the cam-grooved cylinders B B. Each end of the cylinders are spindles which serve as a bearing at one end and at the opposite end they extend outside the case, having connecting pinions, rack, or pulleys for the corresponding adjustment of the grooved cylinders fitted for operating and revolving the cylinders. The spindles may be connected with a float in a tank or other receptacle automatically governing the quantity of fluid passing in or out of said orifice formed by the cam-grooves in the cylinders by the rise or fall of the water in the tank or other receptacle or other suitable way.

In Fig. 3 a float designated C is shown connected by an arm D to a prismatic extension of the spindle of one of said cylinders. If this float be applied to the surface of water in a tank, any increase in the volume of said water will raise said float and turn said cylinders, so as to present a broader part of the cam-grooves, thus enlarging the aperture through which liquid may pass between said cylinders in following the passage A'. When the volume of liquid falls, the reverse action will take place. By turning the float and lever in the other direction a diminution of volume may be caused to increase the flow of liquid, and an increase of volume will diminish it. Thus arranged these devices may be employed to automatically regulate the supply of liquid to the tank, so as to maintain the same quantity always within it, the casing A being introduced into the line of the inflowing current; or if the float and arm are arranged as first above stated, the casing A may be attached to the outlet-pipe of any reservoir, in which case it will diminish the amount given off to correspond to a lessened volume therein. This would be found convenient in cities when it becomes necessary to restrict the demand upon the reservoirs.

Having thus described my invention, what I claim, and desire to secure by Letters Patent, is—

1. A case having a passage for liquid through it, in combination with two cylinders having grooves in their periphery, which taper as to width and depth and are arranged opposite each other, so as to form a passage for liquid, said passage being of greater or less diameter, according to the degree to which said cylinders are turned, substantially as set forth.

2. In combination with a case having a passage for liquid through it, a pair of cylinders journaled in said case and having peripheral grooves arranged opposite each other in said passage, intermeshing gear-wheels fast on the journals of said cylinders, a lever also fast on one of said journals, and a float attached to said arm, the said grooves tapering in width and growing shallow, as shown, so that they leave a passage of greater or less diameter, according to the rising or falling of the float and consequent partial rotation of the cylinders, substantially as set forth.

JOHN B. ANDERSON.

Witnesses:
WILLIAM P. PHELPS,
THOMAS J. DEAVITT.